May 23, 1950 — M. BONNET — 2,508,487
PERISTEREOSCOPIC PHOTOGRAPHIC APPARATUS
Filed Oct. 25, 1945 — 3 Sheets-Sheet 1
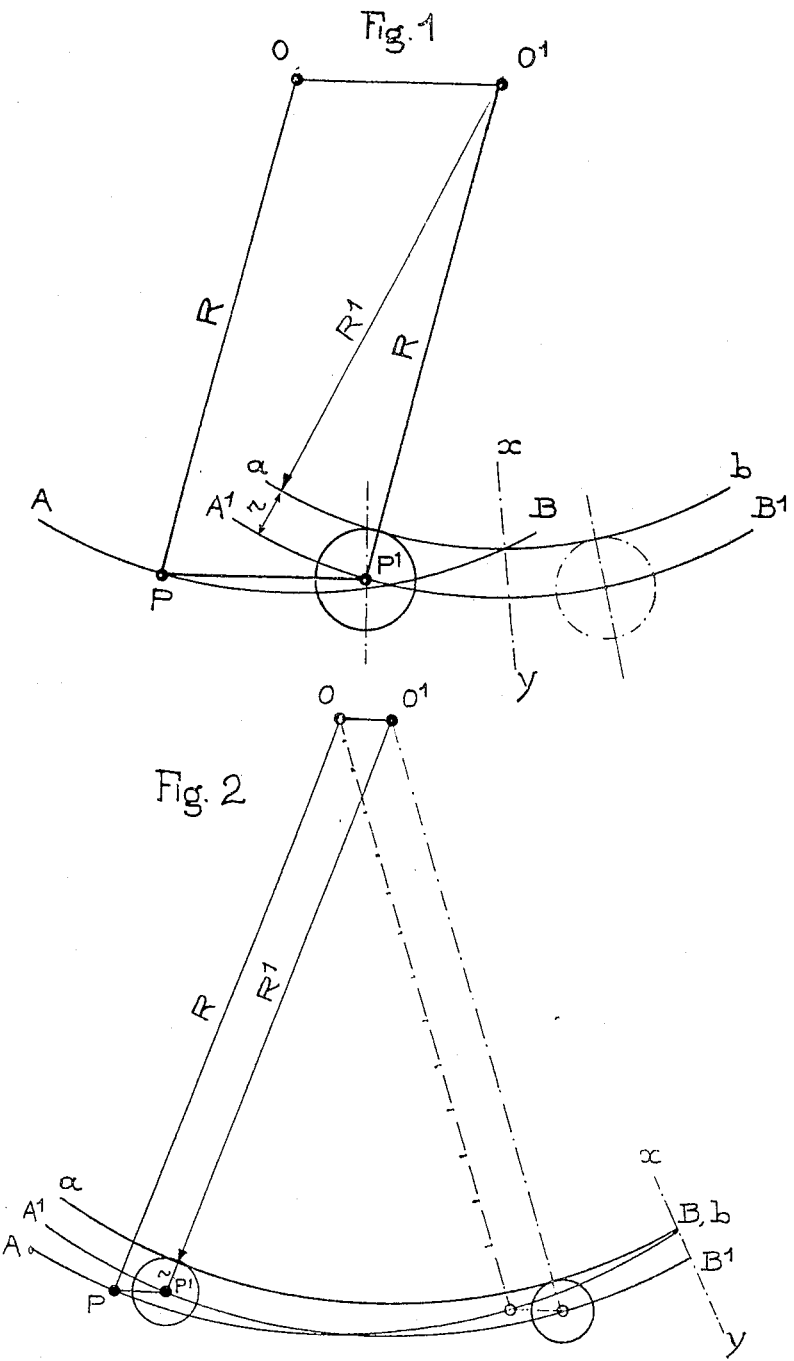
Inventor
MAURICE BONNET
By Haseltine, Lake & Co.
Attorneys May 23, 1950 — M. BONNET — 2,508,487
PERISTEREOSCOPIC PHOTOGRAPHIC APPARATUS
Filed Oct. 25, 1945 — 3 Sheets-Sheet 2
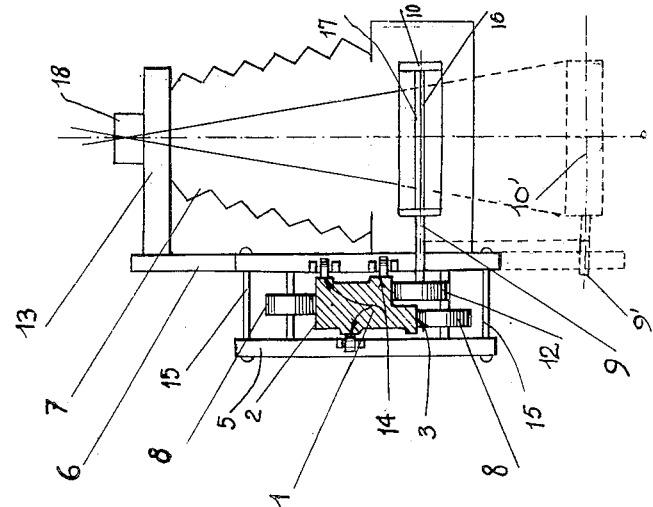
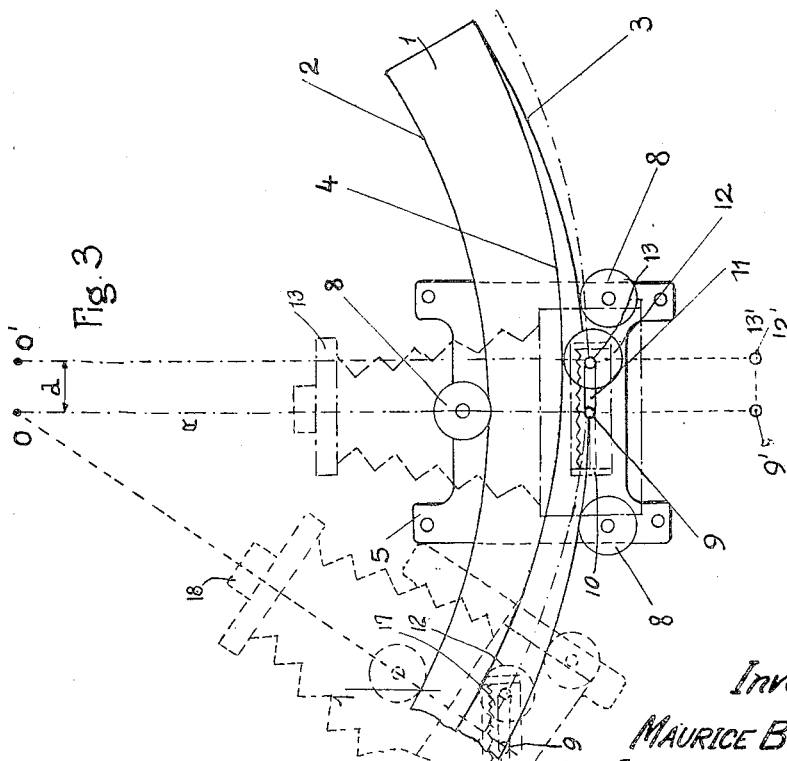
Inventor
MAURICE BONNET
By Haseltine, Lake & Co.
Attorneys

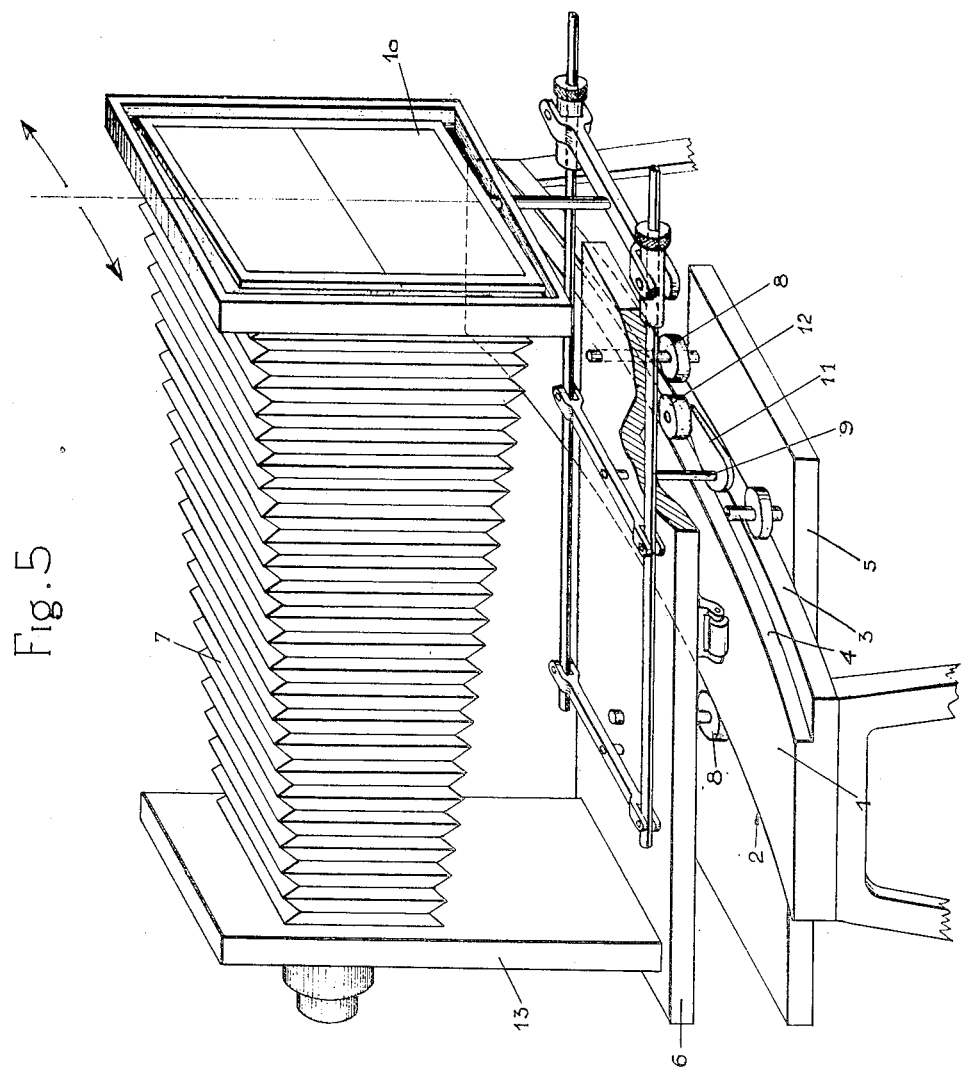

Patented May 23, 1950

2,508,487

UNITED STATES PATENT OFFICE 2,508,487

PERISTEREOSCOPIC PHOTOGRAPHIC APPARATUS

Maurice Bonnet, Paris, France, assignor to La Reliephographie, Societe pour l'Exploitation des Procedes de Photographie en Relief Maurice Bonnet, Paris, France, a corporation of France Application October 25, 1945, Serial No. 624,560
In France August 8, 1941

Section 1, Public Law 690, August 8, 1946
Patent expires August 8, 1961

4 Claims. (Cl. 95—18)

The present invention relates to peri-stereoscopic photographic apparatus, more particularly intended for professional studios, in which the camera or photographic chamber follows a path in an arc of a circle about the point at which the subject is located, the negative-carrier of the camera and therewith the negative, having a relative movement of rotation about a vertical median axis relatively to the camera during the displacement of the latter.

According to the invention the apparatus comprises a table, which is provided not only with tracks intended for rollers with horizontal axes supporting the camera, but also with an inner track and an outer track in the form of concentric arcs of circles having their centre at the sighting point of the camera which effect the guiding of the camera, and a third guiding track or incline, also in the form of an arc of a circle but having a radius and a centre different from those of the two tracks first mentioned, this third track being for the purpose of guiding the negative-carrier.

The photographic pictures obtained with the apparatus according to the invention are peri-stereoscopic pictures, i. e. composite pictures obtained and viewed through a selecting screen known per se.

The invention essentially relates to means for guiding the camera or photographic chamber and the negative-carrier of the said apparatus, in order to control the relative movement thereof.

In the accompanying drawings:

Figure 1 shows the geometrical construction on which the guiding mechanism according to the invention is based;

Figure 2 shows the adaptation of the theoretical construction according to Figure 1 to a practical embodiment;

Figure 3 is a plan view of the guiding mechanism;

Figure 4 shows an axial section thereof, and

Figure 5 shows a diagrammatic perspective view of the complete camera.

It is to be noted that these drawings constitute merely a diagrammatic illustration of the invention, and that they have been traced without any consideration of scale, in order to facilitate the reading thereof.

In Figure 1, $O$ and $O^1$ designate the centres of two circular arcs AB and $A^1B^1$. It is known that if a straight line P—$P^1$, one of the points P of which lies on the arc AB, while another point $P^1$ lies on the arc $A^1B^1$, is displaced along these arcs, the distance between points P and $P^1$ being equal to that separating the two centres $O$ and $O^1$, the straight line P—$P^1$ will always remain parallel to itself. In fact, the opposite sides of the parallelogram $O$—$O^1$—$P^1$—P will always remain equal to one another.

Nothing is changed, of course, if instead of displacing the point $P^1$ along the arc $A^1B^1$, the said point $P^1$ is for instance coincidental with the centre of a circle of radius $r$, which is externally tangential to a third circle or circular arc ab, having its centre at $O^1$ and having a radius $R^1$ equal to R—$r$.

The construction shown in Figure 2 has exactly the same properties as that indicated in Figure 1. It differs therefrom only by the fact that, independently of the different relative proportions of its elements, the circular arcs AB, $A^1B^1$, and ab are interrupted at the line x—y of Figure 1 so as to avoid the crossing of the arcs of circle AB and ab.

This constructional modification enables the construction of the practical embodiment diagrammatically illustrated in plan in Figure 3 and solves the problem of effecting the guiding of a photographic chamber along an arc of circle of given radius, while at the same time rotating a negative-carrier relatively to the said chamber around a vertical median axis.

The negative carrier 10 contains the photosensitive plate 16 and the lenticular selector network 17, the cylindrical elements of which are directed parallel to axis 9.

The operation of this device will now be explained with particular reference to Figure 3, which shows in full lines the control mechanism according to the invention, in dot and dash lines the photographic chamber proper, in an intermediate position, and in dotted lines the whole unit in the extreme position.

In the intermediate position the carrier 10 is at right angles to the optical axis 0—9—9', and the light rays issuing from the objective 18 are therefore incident upon the network 17 at a given angle. Hence, a line image is recorded behind each element of the network. The aggregation of all the line images recorded behind all the elements of the network corresponds to a view of the subject as seen by the objective in the intermediate position of the chamber. If the unit comprising the photographic chamber 7 and the pair of trays 5 and 6 is displaced for example toward the left as seen in Figure 3, rollers 8 travelling on tracks 2 and 3 will keep the optical axis of the chamber aimed at point 0, since tracks 2 and 3 are so constructed as to be concentric at this point.

At the same time roller 12 travels on track 4 to cause the rotation of pivot 9 and consequently of the carrier 10 mounted thereon. Hence, the light rays issuing from objective 18 strike the network 17 at an increasing angle as the apparatus becomes more spaced from the intermediate position.

To each new angle of incidence of the light rays there corresponds behind each element of network 17 a new line image. In the same manner as previously described, the aggregation of all the line images corresponding to a new position of the apparatus along its line of travel gives rise to a new and different angular view of the subject.

When the apparatus has travelled the whole course, the total surface of the photo-sensitive medium has been progressively impressed behind each element of the network due to the scanning effect.

The negative obtained in this manner is removed from carrier 10 then developed and thereafter used for printing positives, which give a relief view of the object situated at point 0 when they are viewed through a lenticular selecting network identical with network 17.

In Figures 3 and 4 the device by means of which the roller 12 is pressed on the incline 4 have not been illustrated, nor those which ensure the application without play of the rollers 8 to the tracks 2 and 3. Similar means are also used for ensuring the application, on their respective tracks, of rollers with horizontal spindles, which roll on the upper and lower faces of the table 1. Any vibration of the apparatus during its operation is thus eliminated.

As the constant parallelism of the negative-carrier relatively to itself, in the successive positions it occupies during the movement effected by the chamber along an arc of a circle, constitutes the most general case, since it satisfies the conditions for obtaining direct peri-stereoscopic pictures, the foregoing description has been given on this basis. However, any other law of rotation about its vertical pivot can if required be imposed on the negative-carrier 10, by reversing the position of the lever 11, which carries the roller 12, relatively to the axes 0—0', by modifying the length thereof, or by interposing speed-reducing or speed-raising gearing between the roller 12 and the pivot 9 of the negative-carrier.

In the device that has just been described, the position of the pivot 9 in the plate 6 is unchangeable, and the focussing of the image can therefore be effected only by displacing the front body 13 of the camera. In order to enable the size of the picture to be changed, according to the invention use can be made of any supplementary device having telescopic arms, or forks sliding on guiding rods, for effecting a variation of the length of both the longer sides of the parallelogram when the whole of the rear body of the chamber is moved, and bringing the points 9 and 12 to 9', 12' for instance. The negative-carrier then assumes the position 10' indicated in Figure 4, and nothing is modified thereby in the operation of the device. Figure 5 which is a perspective view in diagram form of a slight modification of the apparatus of Figures 3 and 4 shows the principal importance of the device. This figure is intended to indicate more particularly how the rear portion of the apparatus and more particularly the negative carrier 10 may be moved forward or backward along the optical axis for focusing purposes, at the same time as pivot $9^2$. The mechanism for carrying out this movement comprises essentially sleeves 19 sliding on the rods 20 of a parallel linkage system similar to that which has already been described.

Whereas the table 1 has been shown as being in one piece, it may of course be designed in several sections suitably connected, when apparatus of large dimensions having a large base is contemplated.

In order to extend the possibilities of utilisation of the apparatus, it may also be equipped with one or more sets of inclines, superposed or juxtaposed so as to enable the camera to be displaced along paths in arcs of circles of different radii, by transporting the movable unit so that the rollers 8 and 12 roll on the inclines of one and the same set.

A complete peri-stereoscopic photographic camera such as shown in Figure 5 comprises of course numerous auxiliary devices, the construction of which may vary according to circumstances, and which need not be described in detail here. All apparatus having the general differential guiding features described and illustrated remain included in the scope of the present invention.

Having now particularly described and ascertained the nature of my said invention and in what manner the same is to be performed, I declare that what I claim is:

1. In a peri-stereoscopic photographic apparatus, wherein the camera or photographic chamber is movable along a path in an arc of a circle about a point at which the subject is located, the negative-carrier of the camera having a movement of rotation about a vertical median axis, relatively to the camera, during the displacement of the latter, a table comprising horizontal tracks intended for rollers with horizontal axes supporting the camera, an inner vertical track and an outer vertical track, in the form of concentric arcs of circles having their centre at the sighting point of the camera, said concentric tracks being intended for rollers with vertical axes effecting the guiding of said camera, and a third guiding track, also in the form of an arc of a circle, but having a radius and a centre different from those of said concentric tracks, said eccentric track being intended to guide the negative-carrier, in its rotating movement.

2. In a peri-stereoscopic photographic apparatus, wherein the camera or photographic chamber is movable along a path in an arc of a circle about a point at which the subject is located, the negative-carrier of the camera having a movement of rotation about a vertical median spindle, relatively to the camera, during the displacement of the latter, a table comprising horizontal tracks intended for rollers with horizontal axes supporting the camera, an inner vertical track and an outer vertical track in the form of concentric arcs of circles, having their centre at the sighting point of the camera, said concentric tracks being intended for rollers with vertical axes effecting the guiding of said camera, and a third guiding track, also in the form of an arc of a circle, but having a radius and a centre different from those of said concentric tracks, said eccentric track being intended to guide the negative-carrier in its rotating movement, the vertical median spindle of the negative-carrier having secured thereto, an arm carrying a guiding roller coacting with said eccentric track, the length of said arm being equal to the distance between the centre of said concentric tracks and the centre of said eccentric track.

3. In a peri-stereoscopic photographic apparatus, wherein the camera or photograhpic chamber is movable along a path in an arc of a circle about a point at which the subject is located, the negative-carrier of the camera having a movement of rotation about a vertical median spindle, relatively to the camera, during the displacement of the latter, a table comprising horizontal tracks intended for rollers with horizontal axes supporting the camera, an inner vertical track and an outer vertical track in the form of concentric arcs of circles having their centre at the sighting point of the camera, said concentric tracks being intended for rollers with vertical axes effecting the guiding of said camera, and a third guiding track also in the form of an arc of a circle, but having a radius and a centre different from those of said concentric tracks said eccentric track being intended to guide the negative-carrier in its rotating movement, the vertical median spindle of the negative carrier having secured thereto an arm carrying a guiding roller, coacting with said eccentric track, the length of said arm being equal to the distance between the centre of said concentric tracks and the centre of said eccentric track, said guiding roller having a radius equal to the difference between the radius of the outer concentric track and the radius of the eccentric track.

4. In a peri-stereoscopic photographic apparatus wherein the camera or photographic chamber is movable along a path in an arc of a circle about a point at which the subject is located, the negative-carrier of the camera having a movement of rotation about a vertical median axis, relatively to the camera, during the displacement of the latter, a table comprising horizontal tracks intended for rollers with horizontal axes supporting the camera, an inner vertical track, and an outer vertical track, in the form of concentric arcs of circles having their centre at the sighting point of the camera, said eccentric tracks being intended for rollers with vertical axes, effecting the guiding of said camera, and a third guiding track also in the form of an arc of a circle, but having a radius and a centre different from those of said concentric tracks, said eccentric tracks being intended to guide the negative-carrier in its rotating movement, two rods parallel to the sighting axis of said camera in a horizontal plane, a horizontal beam adjustable along said rods and hinged thereto, a vertical spindle rigid with said beam coaxial with the median axis of the negative carrier and fixed thereto, a second beam parallel to the said first beam and hinged to said rods and a vertical spindle rigid with said second beam having an arm secured thereto carrying a guiding roller coacting with said eccentric track, the length of said arm being equal to the distance between the centre of said concentric tracks and the centre of said eccentric tracks.

MAURICE BONNET.

REFERENCES CITED

The following references are of record in the file of this patent:

UNITED STATES PATENTS

| Number | Name | Date |
| --- | --- | --- |
| 933,801 | Verbeck | Sept. 14, 1909 |
| 1,232,993 | Tanquary et al. | July 10, 1917 |
| 1,312,675 | Beyer | Aug. 12, 1919 |
| 1,347,062 | Stromberg | July 20, 1920 |
| 2,150,932 | McDonnell | Mar. 21, 1939 |
| 2,158,660 | Kanolt | May 16, 1939 |
| 2,386,276 | Simjian | Oct. 9, 1945 |

FOREIGN PATENTS

| Number | Country | Date |
| --- | --- | --- |
| 181,633 | Germany | Mar. 2, 1907 |
| 590,853 | France | Mar. 26, 1925 |